United States Patent [19]

Hau

[11] 3,828,554
[45] Aug. 13, 1974

[54] TORQUE CONVERTER
[75] Inventor: Antonin Hau, Praha, Czechoslovakia
[73] Assignee: Ustav pro vyzkum motorvych vozidel, Praha, Czechoslovakia
[22] Filed: Feb. 9, 1973
[21] Appl. No.: 331,113

[30] Foreign Application Priority Data
Nov. 26, 1971 Czechoslovakia............... 8254-71

[52] U.S. Cl.................. 60/361, 60/364, 60/366
[51] Int. Cl............................................ F16h 41/00
[58] Field of Search............ 60/325, 327, 361, 366, 60/367, 362, 264, 365

[56] References Cited
UNITED STATES PATENTS
| | | | |
|---|---|---|---|
| 2,093,498 | 9/1937 | Walti | 60/363 X |
| 2,815,648 | 12/1957 | Huntington | 60/361 X |
| 3,125,857 | 3/1964 | Schneider | 60/361 |
| 3,482,400 | 12/1969 | Giraud | 60/362 |

Primary Examiner—Edgar W. Geoghegan
Attorney, Agent, or Firm—Murray Schaffer

[57] ABSTRACT

A hydraulic torque converter comprising a pump wheel, a turbine wheel each having radially inward blades of a circular segment shape and a stator conversion unit. The stator unit comprises a plurality of fixed reactor blades uniformly spaced between a pair of coaxial cylindrical rings, each of the blades having its axial leading and trailing edges when viewed in the axial direction offset relative to each other so that they do not overlap. The root of the reactor blades are integrally cast with one cylindrical ring forming a hub and their outer ends are secured to the other ring about which a torroidal riser is secured having an outer surface conforming to the segment shape blades and is located between to the outer surface of the outer ring and extend between the pump and turbine wheels.

2 Claims, 2 Drawing Figures

TORQUE CONVERTER

BACKGROUND OF THE INVENTION

The present invention relates to a hydraulic torque converter for use in the automatic transmissions of motor cars.

In Czechoslovak Patent No. 118,059 there is shown a novel method and construction of the pump and turbine wheels of a torque converter. The turbine and pump wheels are formed in simple bipartite form. However, the manufacture of the stator conversion mechanism was not improved and it remained most diffcult to manufacture. The actual manufacture of this stator mechanism was in multipartite form and the several independently produced parts require individual attachment to the stator rings, which rings form the inner cavity of the power conversion mechanism and are located between the inner surface of the blades, pump and the turbine.

It is the object of the present invention to provide a torque converter in which the disadvantages of the prior art are overcome.

It is an object of the present invention to provide a hydraulic torque converter in which an improved stator conversion mechanism is provided.

It is a further object of the present invention to provide a hydraulic torque converter in which the stator converter mechanism is provided as a unitary member, preferably cast in one piece.

It is a further object of the present invention to provide a hydraulic torque converter which has a simplified form and is therefore less costly in production and use.

The foregoing objects, other objects, as well as numerous advantages of the present invention, are set forth in the following disclosure thereof.

SUMMARY OF THE INVENTION

In accordance with the present invention an hydraulic torque converter is provided comprising a pump wheel, a turbine wheel and a stator converting mechanism which is formed of a plurality of fixed blades uniformly spaced radially between a pair of coaxial cylindrical rings. The axial leading and trailing edges of each of the blades are offset so that they do not mutually overlap when viewed in the axial direction. This construction permits the stator to be cast as a unitary integral member and to be easily arranged between the pump and turbine sheels.

Further, in accordance with the present invention, a torus ring forming an annular riser is cast in a unitary manner with the conversion mechanism so as to surround the outer cylindrical ring and extend within the interior cavity formed by the arcuately shaped pump and turbine wheels.

Full details of the present invention are set forth in the following description in which reference is made to the accompanying drawing.

DESCRIPTION OF THE INVENTION

Figure 1:
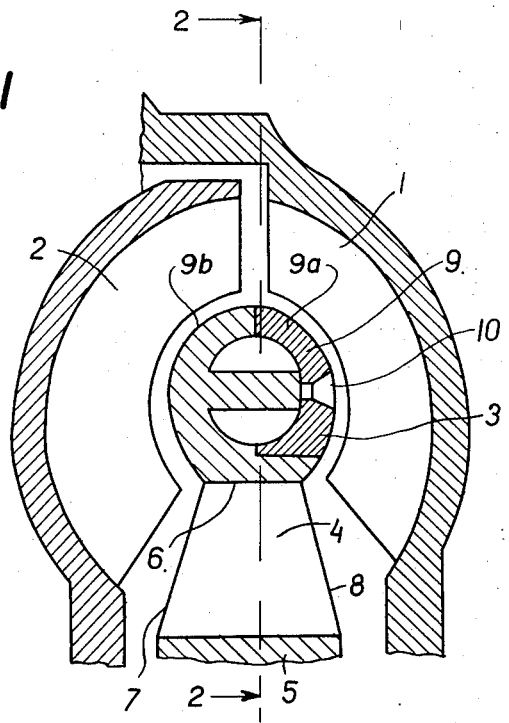
FIG. 1 is a meridial sectional view through the torque converter embodying the present invention taken along line 1—1 of FIG. 2.

As seen in FIG. 1, the torque converter of the present invention comprises an assembly having a vaned pump wheel 1, a vaned turbine wheel 2, and a stator conversion unit 3. The assembly is enclosed in an oil-tight housing and is adapted to rotate about a common central drive or transmission axis. The pump feeds oil under pressure to the turbine wheel in a conventional manner and the stator conversion unit cyclically funnels the oil at an increasing speed and force so as to convert the torque produced by the pump to a greater torque on the turbine wheel. Since the torque converter and its operation are otherwise conventional, further details of its structure and its relationship to the entire transmission are not believed necessary in the present disclosure and are therefore omitted for the sake of brevity.

Figure 2:
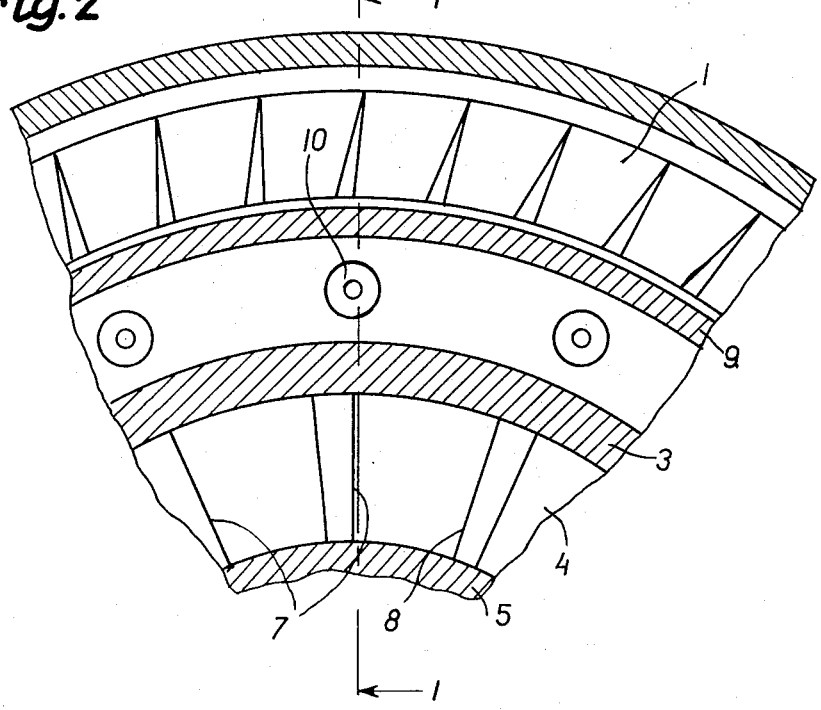
FIG. 2 is a partial view of an axial elevational section through the torque converter as taken along line 2—2 of FIG. 1.

The stator converter 3 comprises a plurality of vanes or blades 4 secured at their root to the outer surface of an inner cylindrical ring 5. The blades 4 are arranged uniformly about the cylindrical ring 5 with their outer edges lying uniformly on the inner surface of an outer cylindrical ring 6 coaxially arranged with the inner ring 5. The blades 4 as seen in FIG. 2 are pitched when viewed in their axial direction so that the front edges 7 and their rear edges 8 do not overlap each other. That is the leading and trailing edges of the stator blades 4 are offset relative to each other at an angle to the axis of rotation of the torque converter.

As seen in FIG. 1 the edges of the vanes of the pump and turbine wheels 1 and 2, as seen in cross-section, are arcuate and define an inner cavity therebetween. This inner cavity is filled by a torroidal riser 9 which is cast or molded integrally with the outer ring 6. In the event the stator converter unit itself is to be press molded or pressure cast, the riser 9 may be preferably formed of two parts 9a and 9b which are then fastened together by a rivet or bolt 10. In general, the riser 9 is somewhat like a hollow tube and is provided with cross-webs for the insertion of the rivets 10. The portion 9a of the riser should, of course, be the most substantial portion and it should be integrally secured with the remainder of the stator conversion mechanism.

The stator conversion mechanism is preferably cast from a conventional aluminum alloy or other nonferrous or ferrous metals conventionally used in the art. Because of the construction indicated in FIG. 1 the stator conversion mechanism including the inner and outer rings, blades and the major portion of the riser 9 are easily cast in a simple bipartite mold. Thus, according to the present invention, the method of manufacture is greatly simplified resulting in considerable savings in both manufacturing and installation costs. A detailed description of the mold is not believed necessary since the mold otherwise would conform to generally accepted practices in this art.

It will thus be seen from the foregoing that the present invention provides an improved construction of a hydraulic torque converter in which the stator conversion mechanism is simplified in its construction and represents a generally unitary one piece member with perhaps an addition of a closing piece such as that indicated by numeral 9b. Furthermore, the present invention provides for the construction of a stator mechanism having a riser adapted to assist in the better distribution of the pumped oil, which riser is integrally formed with the stator and is adapted to closely fill the cavity between the pump and turbine wheels.

The present invention lends itself to many modifications and embodiments. These changes will be obvious to those skilled in this art. Accordingly, it is intended that the present disclosure be taken as illustrative only and not as limiting the scope of the present invention.

What is claimed is:

1. A hydraulic torque converter comprising a pump wheel and a turbine wheel each having a plurality of uniform blades extending inwardly toward each other and ending in arcuate edges defining a torroidal chamber having a circular cross section, a stator conversion unit located within said pump and turbine wheels comprising a central cylindrical hub, a plurality of fixed reactor blades extending radially outward therefrom, each of said reactor blades having its axial leading and trailing edges offset relative to each other so that they do not overlap, and a torroidal ring located about the periphery of said blade, said ring substantially filling the torroidal chamber defined by the blades of said pump and turbine wheels and having a surface conforming to the circular cross section thereof, said cylindrical hub, reactor blades and peripheral ring being formed as a unitary casting.

2. The torque converter according to claim 1 wherein said peripheral ring is formed of at least two parts secured together.

* * * * *